(12) United States Patent  
Kim

(10) Patent No.: US 11,837,123 B2
(45) Date of Patent: Dec. 5, 2023

(54) HOLOGRAM GENERATION DEVICE AND METHOD ENABLING TWO-WAY INTERACTION USING 3D DATA

(71) Applicant: 3DBANK INC., Seoul (KR)

(72) Inventor: Dong Wook Kim, Seongnam-si (KR)

(73) Assignee: 3DBANK INC., Seoul (KR)

( * ) Notice: Subject to any disclaimer, the term of this patent is extended or adjusted under 35 U.S.C. 154(b) by 0 days.

(21) Appl. No.: 17/770,622

(22) PCT Filed: Dec. 5, 2019

(86) PCT No.: PCT/KR2019/017073
§ 371 (c)(1),
(2) Date: Jun. 13, 2022

(87) PCT Pub. No.: WO2021/080083
PCT Pub. Date: Apr. 29, 2021

(65) Prior Publication Data
US 2022/0319367 A1    Oct. 6, 2022

(30) Foreign Application Priority Data
Oct. 21, 2019    (KR) .......................... 10-2019-0130440

(51) Int. Cl.
*G09G 3/00*    (2006.01)
*G02B 30/40*    (2020.01)
(Continued)

(52) U.S. Cl.
CPC ............. *G09G 3/003* (2013.01); *G02B 30/40* (2020.01); *G06F 3/04815* (2013.01);
(Continued)

(58) Field of Classification Search
CPC ............. G09G 3/003; G09G 2300/023; G09G 2354/00; G09G 2370/02; G02B 30/40;
(Continued)

(56) References Cited

U.S. PATENT DOCUMENTS 6,844,948 B2 *    1/2005   Lieberman ............... G03H 1/22
                                                        359/23
7,490,941 B2 *    2/2009   Mintz .................... G02B 30/54
                                                        353/50
(Continued)

FOREIGN PATENT DOCUMENTS

KR    10-2007-0093523 A    9/2007
KR    10-2009-0103575 A    10/2009
(Continued)

OTHER PUBLICATIONS

International Search Report for PCT/KR2019/017073 dated Jul. 10, 2020 from Korean Intellectual Property Office.

*Primary Examiner* — Benyam Ketema
(74) *Attorney, Agent, or Firm* — Revolution IP, PLLC

(57) ABSTRACT

A hologram generation device includes: a hologram object generation unit for generating a hologram target object composed of planar component bodies in an exploded view in which a plurality of canvases and a 3D object which form a screen area of a flat display panel are exploded in each of at least three directions; a hologram generation unit for generating a three-dimensional hologram of the 3D object by outputting the hologram target object through the flat display panel toward reflective surfaces, respectively, corresponding to the at least three directions; and an interaction providing unit for providing two-way interaction with the three-dimensional hologram in connection with a user terminal.

6 Claims, 8 Drawing Sheets

(51) Int. Cl.
  *G06F 3/04815* (2022.01)
  *G06F 3/04845* (2022.01)
(52) U.S. Cl.
  CPC ... *G06F 3/04845* (2013.01); *G09G 2300/023* (2013.01); *G09G 2354/00* (2013.01); *G09G 2370/02* (2013.01)
(58) Field of Classification Search
  CPC ....... G02B 30/60; G02B 5/09; G06F 3/04815; G06F 3/04845; G06F 2203/04806; G03H 1/268; G03H 2210/30
  See application file for complete search history.

(56) References Cited

U.S. PATENT DOCUMENTS

| | | | | |
|---|---|---|---|---|
| 8,007,109 B2* | 8/2011 | Hong | | G02B 30/00 353/30 |
| 8,046,941 B2* | 11/2011 | Schnuckle | | G09F 19/16 40/406 |
| 8,587,498 B2* | 11/2013 | Connor | | G02B 30/54 359/463 |
| 9,091,911 B2* | 7/2015 | Christensen | | H04N 9/31 |
| 9,618,760 B2* | 4/2017 | Cornford | | G02B 30/37 |
| 9,910,409 B2* | 3/2018 | Juni | | G02B 17/002 |
| 10,120,335 B2* | 11/2018 | Rotschild | | G03H 1/0248 |
| 11,303,879 B2* | 4/2022 | Masumura | | H04N 13/305 |
| 2003/0184831 A1* | 10/2003 | Lieberman | | G09F 19/12 359/22 |
| 2006/0171008 A1* | 8/2006 | Mintz | | H04N 13/363 348/E13.058 |
| 2008/0144175 A1* | 6/2008 | Simonsen | | A47F 11/10 359/479 |
| 2008/0218854 A1* | 9/2008 | Hoshino | | H04N 13/302 359/462 |
| 2011/0002038 A1* | 1/2011 | Wang | | H04N 13/388 359/479 |
| 2011/0234981 A1* | 9/2011 | Wang | | H04N 13/39 353/10 |
| 2011/0273364 A1* | 11/2011 | Christensen | | G09F 19/16 345/7 |
| 2013/0155502 A1* | 6/2013 | Kwak | | H04N 13/302 359/462 |
| 2014/0049448 A1* | 2/2014 | Christensen | | H04N 9/31 345/1.3 |
| 2014/0204185 A1* | 7/2014 | Liu | | H04N 13/351 348/54 |
| 2014/0267593 A1* | 9/2014 | Kim | | H04N 23/635 348/36 |
| 2015/0062294 A1* | 3/2015 | Sibley | | H04N 13/302 353/7 |
| 2015/0338674 A1* | 11/2015 | Cornford | | G02B 30/56 359/479 |
| 2016/0205385 A1* | 7/2016 | Sibley | | G02B 1/002 348/51 |
| 2016/0269673 A1* | 9/2016 | Crowder | | A63J 21/00 |
| 2018/0003997 A1* | 1/2018 | Juni | | G02B 30/27 |
| 2019/0007677 A1* | 1/2019 | Thomas | | G02B 30/34 |
| 2022/0319367 A1* | 10/2022 | Kim | | G09G 3/003 |

FOREIGN PATENT DOCUMENTS

| | | |
|---|---|---|
| KR | 10-2011-0117040 A | 10/2011 |
| KR | 10-2018-0102833 A | 9/2018 |
| KR | 10-2018-0123241 A | 11/2018 |
| KR | 10-2002009 B1 | 7/2019 |
| WO | 2019-156409 A1 | 8/2019 |

\* cited by examiner

【Figure 1】
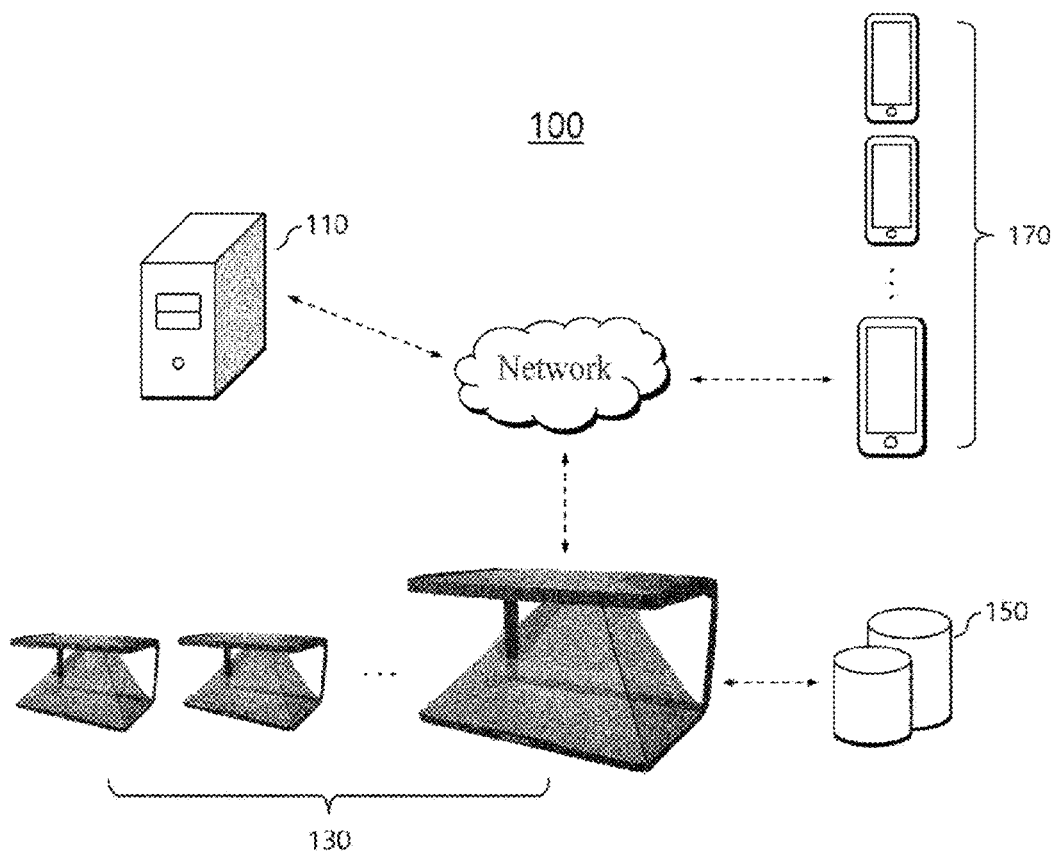

[Figure 2]
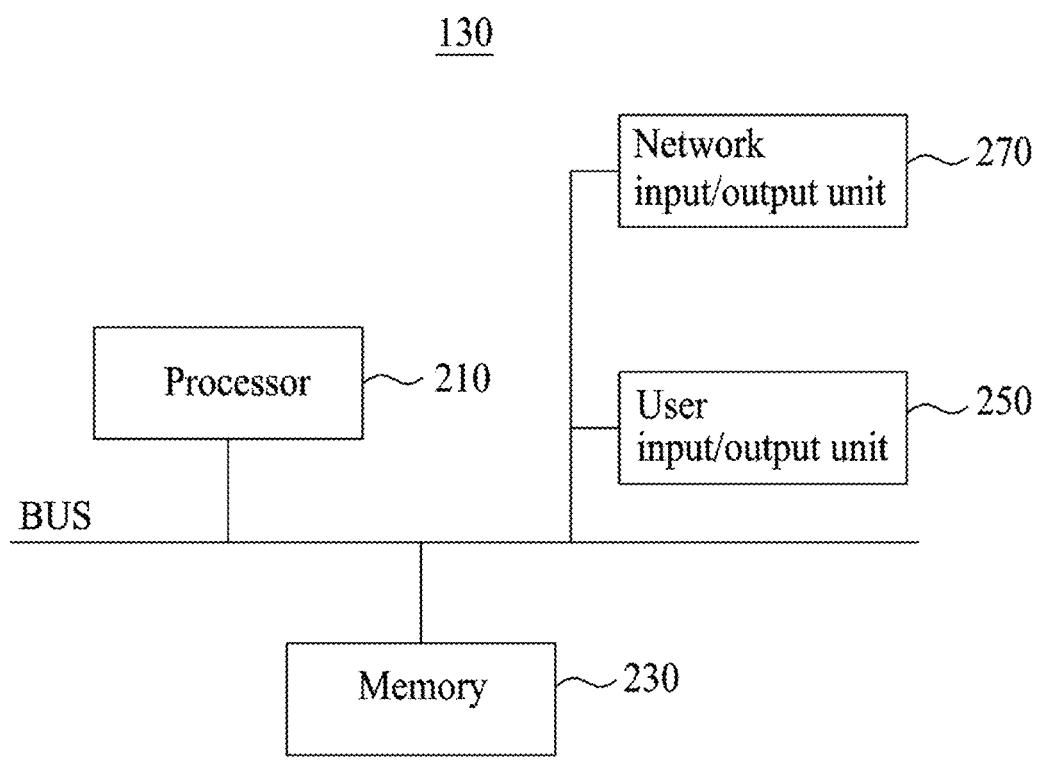

【Figure 3】
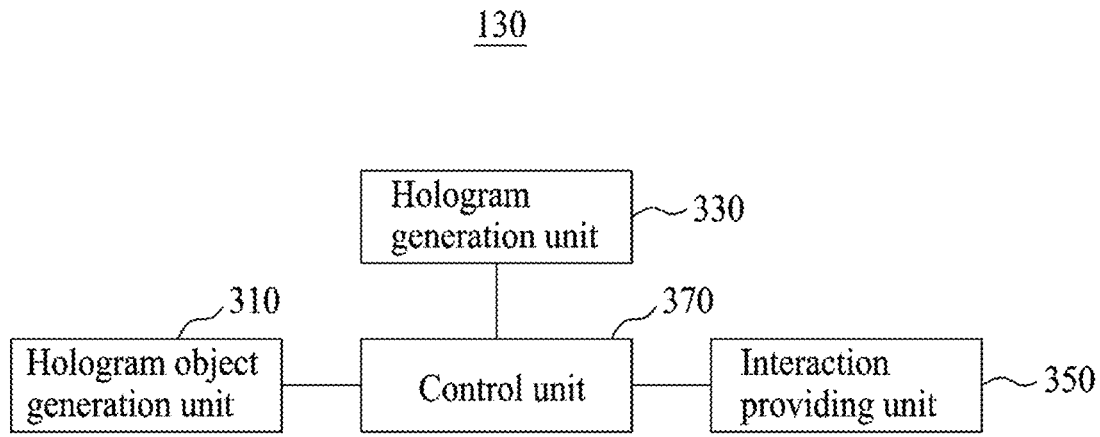
【Figure 4】
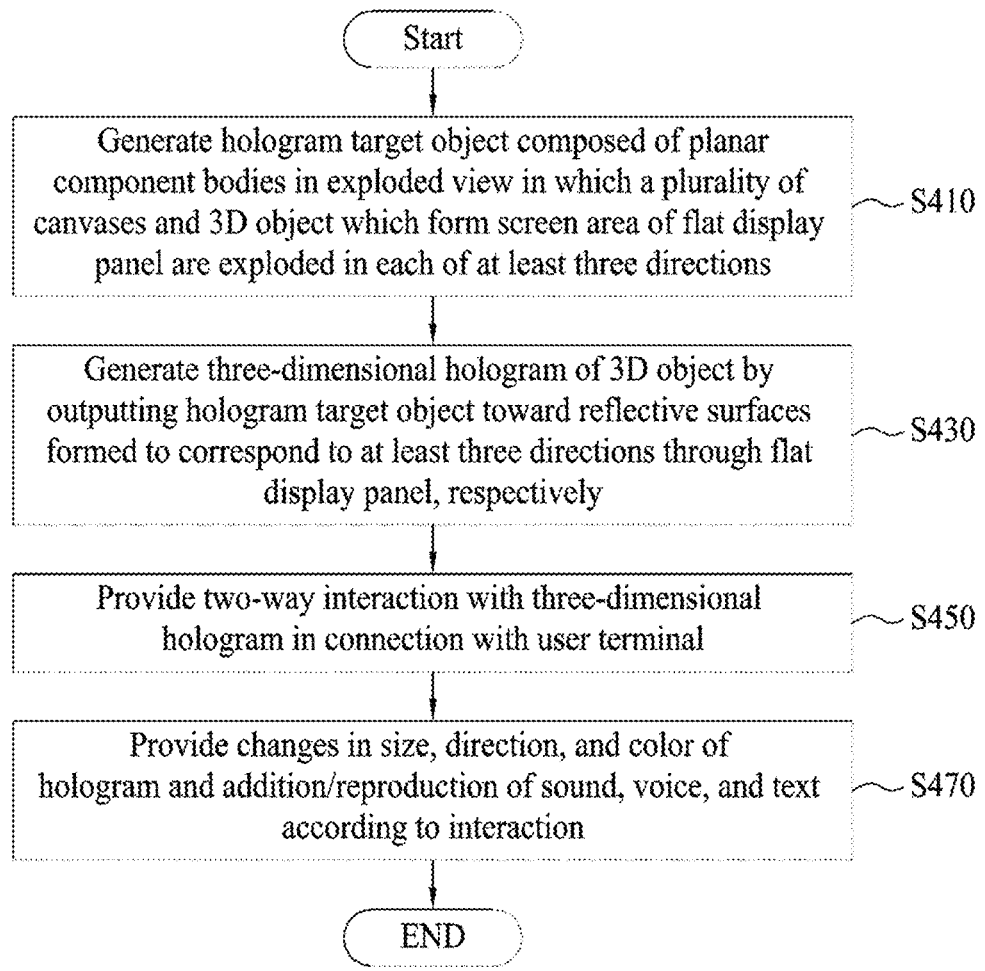

[Figure 5]
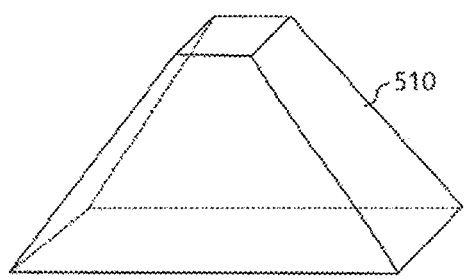
(a)
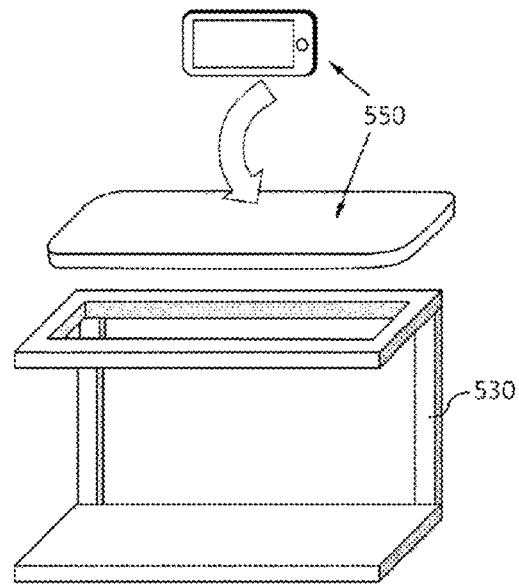
(b)

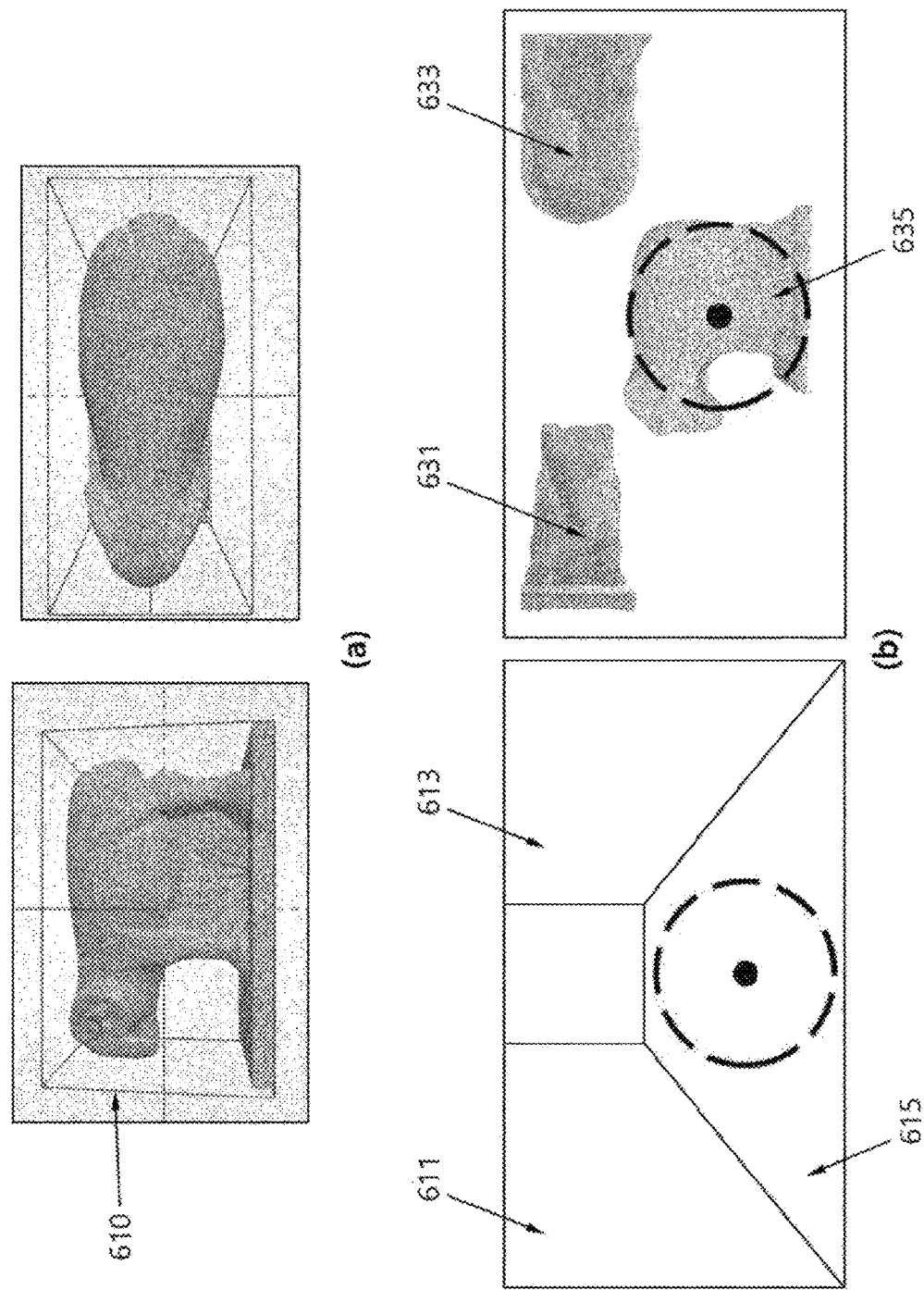
[Figure 6]

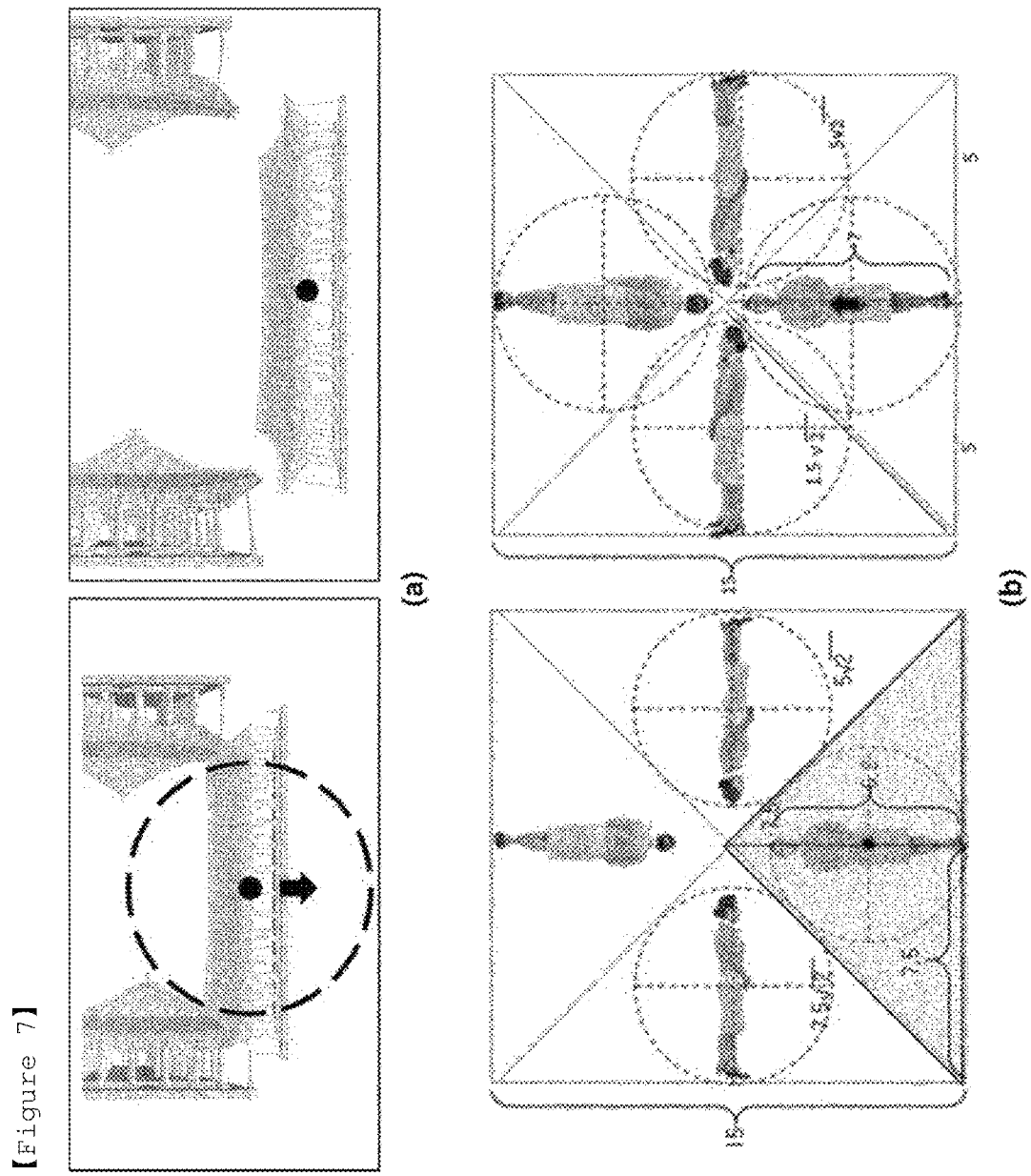
[Figure 7]

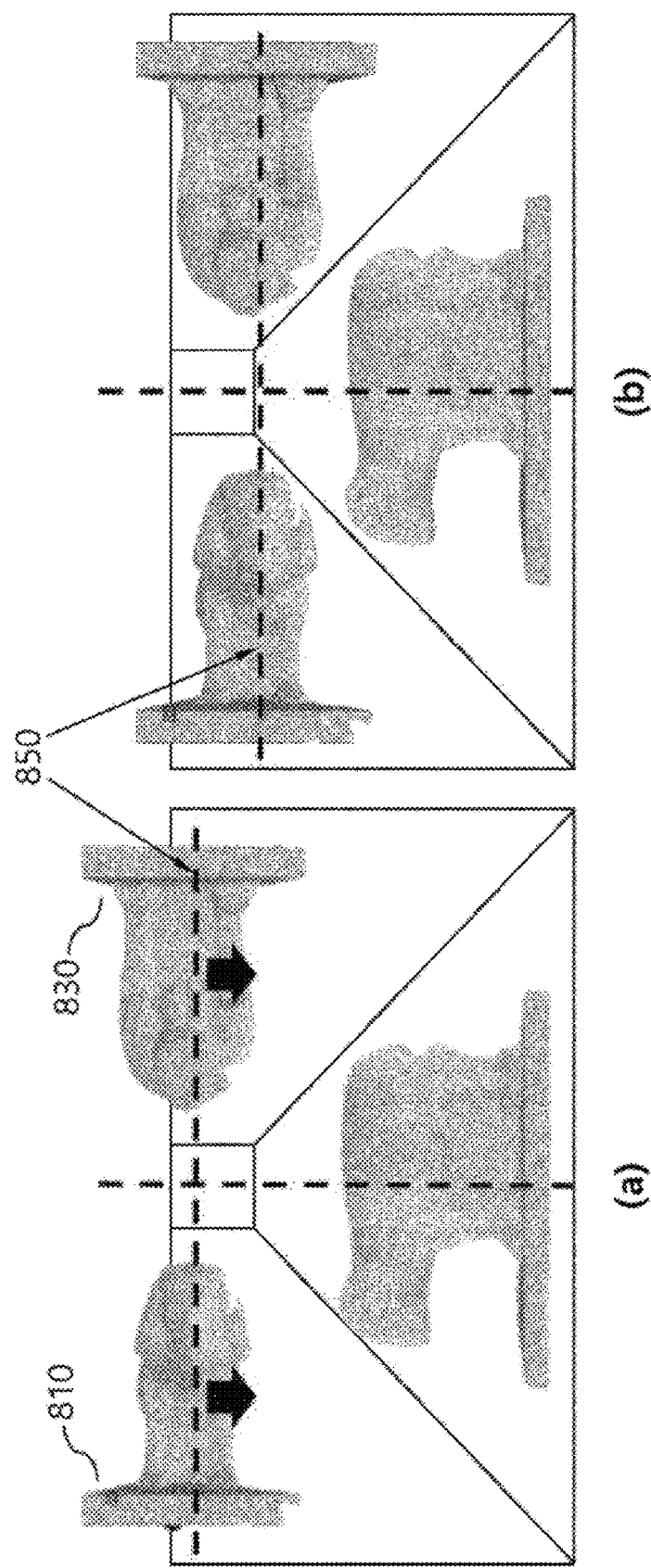
[Figure 8]

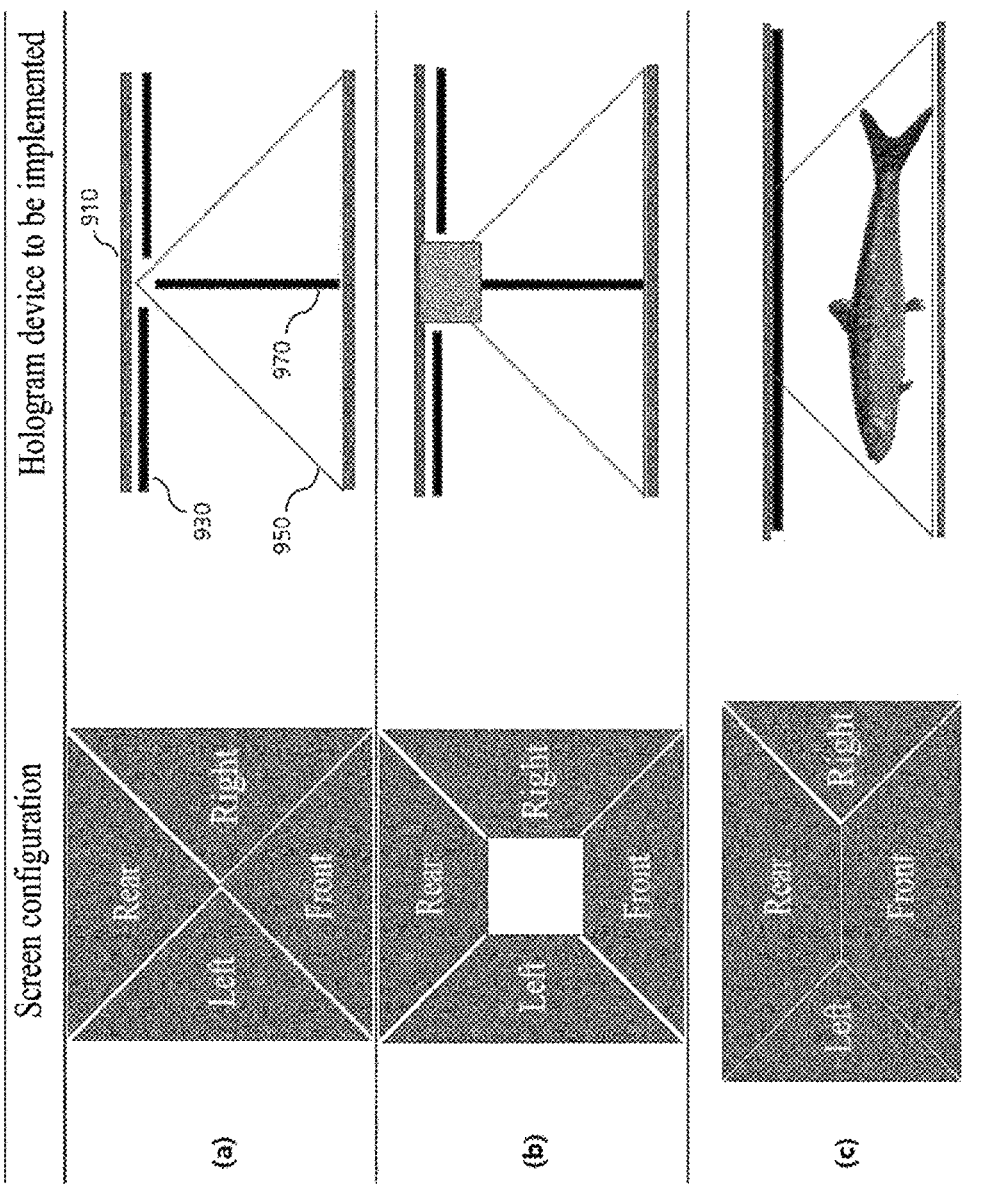
[Figure 9]

HOLOGRAM GENERATION DEVICE AND METHOD ENABLING TWO-WAY INTERACTION USING 3D DATA

TECHNICAL FIELD

The present invention relates to a hologram generation technology using 3D data, and more particularly, to hologram generation device and method enabling two-way interaction capable of providing interaction with a hologram generated by reflecting a hologram target object (3D data) on a polyhedron.

BACKGROUND ART

Recently, as technology for providing 3D stereoscopic images has developed, products or services that provide various types of realistic images such as 3D TV or hologram performances are emerging. The image may be provided in consideration of a difference between viewpoints viewed by the left and right eyes, or may be provided by varying images recognized by the left and right eyes through special glasses as in the case of a 3D TV. As a form of providing a 3D effect using hologram technology, a floating image method has been commercialized recently.

Korean Laid-open Patent Publication No. 10-2007-0093523 (Sep. 19, 2007) relates to an automatic advertisement device using a hologram, and there is disclosed a technology to show three-dimensional images or texts by reproducing a hologram using a photosensitive plate in which a stereoscopic image is captured in an advertising device that rotates slowly at a constant speed and a light source device such as a laser and the like in order to provide an advertising device that is more colorful than a conventional advertising device and can stimulate curiosity to attract the attention of surrounding people.

Korean Laid-open Patent Publication No. 10-2009-0103575 (Oct. 1, 2009) relates to a hologram imaging device for advertisement, and there is disclosed a technology capable of remarkably improving an advertising effect by exposing an image even to a person in any direction by successive installation of screen members using a hologram along the side of a stereoscopic image unit unlike conventional inventions and reducing installation and maintenance costs by implementing the image even by fewer projectors than screen members by rotating the projectors irradiating the image on the screen members by a rotating body.

PRIOR ART DOCUMENT

[Patent Document]
Korean Laid-open Patent Publication No. 10-2007-0093523 (Sep. 19, 2007)
Korean Laid-open Patent Publication No. 10-2009-0103575 (Oct. 1, 2009)

DISCLOSURE

Technical Problem

A general floating image type hologram creates a 2D image and creates the 2D image into a hologram image to implement a hologram through a hologram device. The most representative example is a hologram performance, or the like, and there are pyramid-type holograms and the like in museums and exhibition halls.

However, such holograms are used for events and the like, but have not been universalized due to the time and cost problems involved in producing 2D images and the boredom of simply viewing.

If there is a hologram device using realistic services such as AR/VR and holograms, and 3D data used for 3D printing and 3D viewer technology capable of viewing the 3D data, it is easy to produce hologram contents. In addition, when an interaction function enabling interaction is added, even if a real object is not touched, there may be an effect of touch and viewing the real object, and as a result, the hologram device can be used for general exhibitions, education, and realistic services in addition to museum exhibitions.

Therefore, an embodiment of the present invention is to provide hologram generation device and method enabling two-way interaction capable of providing interaction with a hologram generated by reflecting planar component bodies of 3D data on a polyhedron.

Another embodiment of the present invention is to provide hologram generation device and method enabling two-way interaction using 3D data capable of minimizing wasted screen space on a flat display panel of the hologram device by maximizing the sizes of planar component bodies of the 3D data.

Yet another embodiment of the present invention is to provide hologram generation device and method enabling two-way interaction using 3D data capable of providing interaction for the hologram by providing synchronization between devices in a process of generating the hologram through a mobile display device for generalization of the use of hologram technology.

Technical Solution

According to embodiments, there is provided a hologram generation device enabling two-way interaction including a hologram object generation unit for generating a hologram target object composed of planar component bodies in an exploded view in which a plurality of canvases and a 3D object which form a screen area of a flat display panel are exploded in each of at least three directions, a hologram generation unit for generating a three-dimensional hologram of the 3D object by outputting the hologram target object through the flat display panel toward reflective surfaces, respectively, corresponding to the at least three directions, an interaction providing unit for providing two-way interaction with the three-dimensional hologram in connection with a user terminal, and a control unit for controlling the size, color, sound, rotation, direction, etc. of the hologram when implementing the 3D object as the hologram.

The hologram object generation unit may receive 3D data of a 3D object by a user's selection via a network and generate the hologram target object based on the 3D data for a local 3D object.

The hologram object generation unit may perform steps of generating at least one central canvas and left and right canvases symmetrically formed on both sides of the central canvas in an exploded view, arranging a first center of each planar component body and a second center of a circle inscribed in each canvas to match each other in a process of arranging planar component bodies on each of the central canvas and the left and right canvases, respectively, moving the first center downward by a predetermined distance when the horizontal length of the 3D object is greater than the vertical length thereof, or moving the first center upward by a predetermined distance when the vertical length of the 3D object is greater than the horizontal length thereof, with respect to the planar component bodies disposed in the central canvas, and enlarging the sizes of the planar component bodies in a boundary direction of the central canvas based on the first center.

When the hologram target object includes three planar component bodies, the hologram object generation unit may further perform steps of determining the sizes and positions of left and right planar component bodies disposed in left and right canvases, respectively, to correspond to a planar component body disposed in the central canvas, and moving a horizontal central axis of the left and right planar component bodies downward by a predetermined distance.

The hologram generation unit may include a mirror polyhedron module including at least three reflective surfaces and a flat display panel module that projects a hologram target object toward at least three reflective surfaces through flat display panels disposed above the mirror polyhedron module.

The flat display panel module may include a mobile device housing capable of detachably coupling a mobile display device including the flat display panel.

The interaction providing unit may include a function of receiving user's requests (enlargement, reduction, rotation direction, color, sound, voice, text display, rotation stop, play, etc. of holograms) through the connection between the user terminals to transmit the user's requests to the control unit.

The control unit may serve to change in real time at least one of the user's requests (enlargement, reduction, rotation direction, sound, voice, text display, rotation stop, play, etc. of holograms) according to the user control signal received through the interaction providing unit.

According to embodiments, there is provided a hologram generation method enabling two-way interaction including steps of: generating a hologram target object composed of planar component bodies in an exploded view in which a plurality of canvases and a 3D object which form a screen area of a flat display panel are exploded in each of at least three directions, generating a three-dimensional hologram of the 3D object by outputting the hologram target object toward the reflective surfaces formed to correspond to at least three directions through the flat display panel, respectively, and providing a function of controlling an interaction providing unit in connection with the user terminal and a hologram device by a user's request.

Advantageous Effects

Various technologies such as AR, VR, holograms, and MR have been developed as methods of providing realistic services. Among them, the AR/VR/MR requires a special device to enjoy the realistic service as a single person's viewpoint, but a hologram type is a device capable of enjoying realistic services without a special device. However, until now, it has not been easy to unilaterally view hologram images made from 2D images or to generalize the hologram images with interaction of limited functions.

The disclosed hologram technology may have the following effects.

According to an embodiment of the present invention, in the hologram generation device and method enabling two-way interaction using 3D data, it is possible to maximize the sizes of a canvas area and a hologram target object in the corresponding area, and maximize the size of a hologram image in a unit hologram device by minimizing wasted screen space on a flat display panel.

According to an embodiment of the present invention, in the hologram generation device and method enabling two-way interaction using 3D data, it is possible to provide interaction for the hologram by providing connection between devices in a process of generating the hologram through the mobile display device.

The disclosed technology may have a great effect in the field of exhibition, advertisement or education in real life. In the field of exhibition and advertisement, it is possible to provide various exhibitions with respect to things that are difficult to actually see and touch for various other reasons such as too large or too small in size, too expensive, or limited in quantity, etc. by free expansion, reduction, still image, sound play, voice play, and rotation of holograms by using the role of a remote controller through mobile devices.

In terms of education, there are advantages of viewing the upper, lower, and internal portions of historical relics by freely rotating the historical relics as well as viewing organisms that are difficult to see and touch in detail at desired angles and sizes. In addition, since many hologram devices may be controlled simultaneously with one mobile device and one device may be controlled with many mobile devices, it is possible to provide realistic services which are effective for digital education as well as practical for group training of elementary education by allowing children as well as teachers to control the hologram devices directly with their mobiles or tablets.

DESCRIPTION OF DRAWINGS

FIG. 1 is a diagram for describing a hologram generation system according to an embodiment of the present invention.

FIG. 2 is a diagram for describing a physical configuration of a hologram generation device illustrated in FIG. 1.

FIG. 3 is a block diagram for describing a functional configuration of the hologram generation device illustrated in FIG. 1.

FIG. 4 is a flowchart illustrating a hologram generating process enabling two-way interaction performed by the hologram generation device illustrated in FIG. 1.

FIG. 5 is a diagram for describing an embodiment of a hologram generation unit illustrated in FIG. 3.

FIG. 6 is a diagram for describing a process of arranging planar component bodies based on the center of a 3D object.

FIG. 7 is a diagram for describing a process of optimizing the sizes of the planar component bodies.

FIG. 8 is a diagram for describing a process of maximizing a hologram image by aligning the horizontal central axes of left and right planar component bodies when a canvas is composed of three sides.

FIG. 9 is a diagram for describing various embodiments of the hologram generation device illustrated in FIG. 1 and screen configurations of holograms to be generated.

BEST MODE

A description of the present invention is merely an embodiment for a structural or functional description and the scope of the present invention should not be construed as being limited by embodiments described in the specification. That is, since the exemplary embodiment can be variously changed and have various forms, the scope of the present invention should be understood to include equivalents capable of realizing the technical spirit. Further, since the object or effect presented in the present invention does not mean that a specific exemplary embodiment should include all of them or only such an effect, it should not be understood that the scope of the present invention is limited by the object or effect.

Meanwhile, meanings of terms described in the present application should be understood as follows.

The terms "first", "second", and the like are used to differentiate a component from the other component, and the scope of right should not be construed to be limited by the terms. For example, a first component may be referred to as a second component, and similarly, the second component may be referred to as the first component.

It should be understood that, when it is described that a component is "connected to" another component, the component may be directly connected to another component or a third component may be present therebetween. In contrast, it should be understood that when it is described that a component is "directly connected to" the other component, another component is not present therebetween. Meanwhile, other expressions describing the relationship between the components, that is, expressions such as "between" and "directly between" or "adjacent to" and "directly adjacent to" should be similarly interpreted.

It is to be understood that the singular expression encompass a plurality of expressions unless the context clearly dictates otherwise and it should be understood that term "including" or "having" indicates that a feature, a number, a step, an operation, a component, a part or the combination thereof described in the specification is present, but does not exclude a possibility of presence or addition of one or more other features, numbers, steps, operations, components, parts or combinations thereof, in advance.

In each step, as reference numerals (e.g., a, b, c, etc.) are used for convenience of description, the reference numerals are not used to describe the order of the steps and each step may occur differently from the order specified unless a specific order is clearly stated in the context. That is, each step may be performed in the same order as specified order, performed substantially simultaneously, and performed in an opposite order.

The present invention can be implemented by computer-readable codes on a computer-readable recording medium and the computer-readable recording medium includes all types of recording devices for storing data that can be read by a computer system. Examples of the computer readable recording medium may include a ROM, a RAM, a CD-ROM, a magnetic tape, a floppy disk, an optical data storage device, and the like. Further, the computer readable recording media may be stored and executed as codes which may be distributed in the computer system connected through a network and read by a computer in a distribution method.

Unless defined otherwise, all terms used herein have the same meanings as those generally understood by those skilled in the art. Terms which are defined in a generally used dictionary should be interpreted to have the same meaning as the meaning in the context of the related art, and are not interpreted as having an ideal meaning or excessively formal meanings unless clearly defined in the present application.

FIG. 1 is a diagram for describing a hologram generation system according to an embodiment of the present invention.

Referring to FIG. 1, a hologram generation system 100 may include an external system 110, a hologram generation device 130, a database 150, and a user terminal 170.

The external system 110 may correspond to a computing device that supports the hologram generation of the hologram generation device 130, and may be implemented as a smartphone, a notebook computer, or a computer, but is not necessarily limited thereto, and may be implemented in various devices such as a tablet PC.

The external system 110 may be connected to the hologram generation device 130 via a network, and the plurality of external systems 110 may be connected and operated simultaneously with the hologram generation device 130. In a network (Internet) environment, the contents of the external system 110 may be stored in the database 150 through the hologram generation device 130, and the user terminal 170 may approach the contents stored in the database 150 through the hologram generation device 130.

In an embodiment, the external system 110 may operate as a server that stores and manages 3D data or text data of a 3D object to generate a hologram. For example, the user may access the external system 110 and select a 3D object that is a target of the hologram to be generated by the hologram generation device 130, and may enjoy a 3D view of the corresponding 3D object in advance. In addition, the user may transmit 3D data on the 3D object to the hologram generation device 130 through the external system 110.

In an embodiment, the external system 110 may manage the connection between the hologram generation device 130 and the user terminal 170. More specifically, the external system 110 may provide matching between the plurality of hologram generation devices 130 and the plurality of user terminals 170. For example, the user terminal 170 may identify the hologram generation device 130 connectable through the external system 110, and may select a specific hologram generation device 130 to attempt a connection. In this case, the external system 110 may process the connection between the user terminal 170 and the specific hologram generation device 130.

As a result, the external system 110 may process an operation of providing and managing 1:N connection or N:1 connection between the hologram generation device 130 and the user terminal 170 under a network environment. That is, the external system 110 may control only a user approved in advance through matching between the hologram generation device 130 and the user terminal 170 to be connected with each hologram generation device 130 to perform two-way interaction.

The hologram generation device 130 may be implemented as a server corresponding to a computer or program capable of generating a three-dimensional hologram for a 3D object. The hologram generation device 130 may be wirelessly connected to the external system 110 and the user terminal 170 through Bluetooth, WiFi, a communication network, etc., and may transmit and receive data to and from the external system 110 and the user terminal 170 via the network.

In an embodiment, the hologram generation device 130 may store information required in the process of generating a hologram and providing two-way interaction in connection with the database 150. Meanwhile, unlike FIG. 1, the hologram generation device 130 may be implemented by including the database 150 therein. The hologram generation device 130 may be implemented by including a processor, a memory, a user input/output unit, and a network input/output unit, which will be described in more detail with reference to FIG. 2.

In an embodiment, the hologram generation device 130 may process a connection operation with the user terminal 170 independently of the external system 110. That is, the hologram generation device 130 may self-process a connection function provided by the external system 110. More specifically, even when network communication is disconnected, the hologram generation device 130 may directly provide a connection with the user terminal 170 according to a connection request. In this case, the hologram generation device 130 may provide a 1:1 connection with a specific user terminal 170 or a 1:N (one-to-many) connection with a plurality of user terminals 170.

The database 150 may correspond to a storage device for storing various types of information required in the hologram generation process. The database 150 may store 3D data of a 3D object, and may store information about a hologram target object of the 3D object, but is not necessarily limited thereto, and the hologram generation device 130 may generate a three-dimensional hologram and store information collected or processed in various forms in the process of providing the two-way interaction.

The user terminal 170 may correspond to a computing device that may perform two-way interaction with the three-dimensional hologram, and may be implemented as a smartphone, a laptop, or a computer, and may also be implemented, but is not necessarily limited thereto, as various devices such as a tablet PC. The user terminal 170 may be connected with the hologram generation device 130 via a network, and the plurality of user terminals 170 may be connected simultaneously with the hologram generation device 130. That is, one user terminal 170 may operate while being connected to the plurality of hologram generation devices 130, and one hologram generation device 130 may be simultaneously connected to the plurality of user terminals 170 to provide two-way interaction with a three-dimensional hologram.

In an embodiment, the user terminal 170 may be directly connected to the hologram generation device 130 even when network communication is impossible through wireless communication such as Bluetooth or Wifi to perform the two-way interaction with the three-dimensional hologram. In this case, the hologram generation device 130 may generate a hologram using only information stored in the directly connected database 150 and provide the two-way interaction with the user terminal 170.

In an embodiment, the user terminal 170 may reproduce a hologram target object in connection with the hologram generation device 130. In this case, the user terminal 170 may serve as a mobile display device, and may operate as a component of the hologram generation device 130, in which an application for connection with the hologram generation device 130 may be installed. Meanwhile, when the user terminal 170 operates as a mobile display device, the user terminal 170 may be connected to another user terminal 170 to perform the two-way interaction with the three-dimensional hologram.

FIG. 2 is a diagram for describing a physical configuration of a hologram generating apparatus illustrated in FIG. 1.

Referring to FIG. 2, the hologram generation device 130 may be implemented by including a processor 210, a memory 230, a user input/output unit 250, and a network input/output unit 270.

The processor 210 may execute a procedure for processing each operation of the hologram generation device 130 in which a three-dimensional hologram is generated to provide two-way interaction, manage the memory 230 to be read or written throughout this process, and schedule a synchronization time between a volatile memory and a nonvolatile memory in the memory 230. The processor 210 may control the overall operation of the hologram generation device 130, and may be electrically connected to the memory 230, the user input/output unit 250, and the network input/output unit 270 to control a data flow therebetween. The processor 210 may be implemented as a graphic processing unit (GPU) of the hologram generation device 130, but may also be implemented as a central processing unit (CPU) if necessary.

The memory 230 may include an auxiliary storage device which is implemented as a nonvolatile memory, such as a solid state drive (SSD) or a hard disk drive (HDD), to be used to store overall data required for the hologram generation device 130, and may include a main storage device implemented as a volatile memory such as random access memory (RAM).

The user input/output unit 250 may include an environment for receiving a user input and an environment for outputting specific information to the user. For example, the user input/output unit 250 may include an input device including an adapter such as a touch pad, a touch screen, an on-screen keyboard, or a pointing device, and an output device including an adapter such as a monitor or a touch screen. In an embodiment, the user input/output unit 250 may correspond to a computing device to be accessed through remote access, and in such a case, the hologram generation device 130 may be performed as a server, and in this case, the user input/output unit 250 may use Bluetooth, Zigbee, Wi-Fi, etc.

The network input/output unit 270 includes an environment for connecting with an external device or a system via a network, may include an adapter for communication such as a local area network (LAN), a metropolitan area network (MAN), a wide area network (WAN), and a value added network (VAN).

FIG. 3 is a block diagram for describing a functional configuration of the hologram generation device illustrated in FIG. 1.

Referring to FIG. 3, the hologram generation device 130 may include a hologram object generation unit 310, a hologram generation unit 330, an interaction providing unit 350, and a control unit 370.

The hologram object generation unit 310 may generate a hologram target object composed of planar component bodies in an exploded view in which a plurality of canvases and a 3D object which form a screen area of a flat display panel are exploded in each of at least three directions. Here, the planar component bodies may correspond to 2D images of the 3D object viewed from specific directions. For example, the planar component bodies may correspond to front, rear, left, and right directional images of the 3D object.

In addition, the hologram target object, as an object generated based on 3D data of the 3D object, may be expressed in the form of images viewed from various directions. That is, the hologram target object may be output to be included in a plurality of images or moving images consecutive to be reproduced for a specific period in order to implement a hologram for the 3D object. As a result, the hologram target object may correspond to a result product generated by disposing planar component bodies generated by the hologram generation device 130 in canvases constituting the screen area.

On the other hand, the present invention illustrates that a hologram target object is used to generate a hologram as an example, and may be used, but is not limited thereto, in various fields of converting or outputting a 3D object correspondingly to a screen area.

More specifically, the hologram object generation unit 310 may generate a plurality of canvases for forming the screen area of the flat display panel, and the flat display panel may correspond to a display device that outputs images or videos for the 3D object. The hologram object generation unit 310 may generate planar component bodies corresponding to preset directions based on the 3D data of the 3D object, and then optimize the positions and sizes of the planar component bodies in each canvas to generate a hologram target object.

In an embodiment, the hologram object generation unit 310 may receive 3D data of the 3D object determined by a user's selection via a network and generate a hologram target object based on the 3D data. Considering that the amount of data required for generating the hologram is relatively large and a storage space of an internal storage device of the hologram generation device 130 is limited, the hologram generation device 130 may receive 3D data from the external system 110 connected to the network through the hologram object generation unit 310.

Meanwhile, the external system 110 may operate as a server that stores and manages 3D data or text data of the 3D object, and may operate in connection with the hologram object generation unit 310 or by including in the hologram object generation unit 310 as a logical component.

In an embodiment, the hologram object generation unit 310 may perform the steps of generating at least one central canvas and left and right canvases symmetrically formed on both sides of the central canvas in an exploded view, arranging a first center of each planar component body and a second center of a circle inscribed in each canvas to match each other in a process of arranging planar component bodies on each of the central canvas and the left and right canvases, respectively, moving the first center downward by a predetermined distance when the horizontal length of the 3D object is greater than the vertical length thereof, or moving the first center upward by a predetermined distance when the vertical length of the 3D object is greater than the horizontal length thereof, with respect to the planar component bodies disposed in the central canvas, and enlarging the sizes of the planar component bodies in a boundary direction of the central canvas based on the first center.

More specifically, the hologram object generation unit 310 may generate three-sided canvases in an exploded view to be used in a hologram device composed of three reflective surfaces. In this case, the central canvas may be formed in a triangular or trapezoidal shape, and the left and right canvases may be formed in triangular or trapezoidal shapes corresponding to the central canvas, and may be composed of one central canvas and the left and right canvases. Meanwhile, at least one central canvas and the left and right canvases may be disposed on the same plane to form a rectangular flat display screen.

The central canvas and the left and right canvases may correspond to an area in which the planar component bodies are disposed, respectively, and when the respective canvases are combined with each other, one hologram target object may be formed. The size and shape of each canvas may be implemented variously according to the number of reflective surfaces and the size of the hologram target object. For example, the hologram object generation unit 310 may generate four-sided canvases in an exploded view so as to be used for a hologram device composed of four reflective surfaces. In this case, each canvas may be formed in a triangle of the same shape, and the four-sided canvases may be composed of two central canvases and left and right canvases that are symmetrically formed.

In addition, the hologram object generation unit 310 may match a first center of each planar component body and a second center of a circle inscribed in each canvas with each other in the process of arranging the planar component bodies on the central canvas and the left and right canvases, respectively. The central planar component body may generally correspond to an omnidirectional image of the 3D object, and accordingly, the first center may correspond to the center of the 3D object.

For example, the center of the 3D object may correspond to the center of a minimum boundary rectangle including the 3D object. The second center as a center of a circle inscribed in the center canvas may be determined according to the size and shape of the center canvas. The hologram object generation unit 310 may determine basic positions of the planar component bodies in the canvas by matching the center of each of the planar component bodies with the center of the circle inscribed in each canvas with respect to the central canvas and each of the left and right canvases.

Further, the hologram object generation unit 310 may move the first center downward by a predetermined distance when the horizontal length of the 3D object is greater than the vertical length thereof, or move the first center upward by a predetermined distance when the vertical length of the 3D object is greater than the horizontal length thereof, with respect to the planar component bodies disposed in the central canvas. The hologram object generation unit 310 may move the centers of the planar component bodies in order to maximally use the wasted space in the canvas, and the movement direction of the center may be determined depending on a ratio between a horizontal length and a vertical length of the 3D object. That is, the hologram object generation unit 310 may move the first center downward when the horizontal length is greater than the vertical length, and may move the first center upward when the vertical length is greater than the horizontal length.

In addition, the hologram object generation unit 310 may enlarge the sizes of the planar component bodies in the boundary direction of the central canvas based on the first center. More specifically, when the horizontal length of the 3D object is greater than the vertical length, the first center moves downward to secure a space for the planar component bodies in the canvas, and the hologram object generation unit 310 may increase a screen utilization rate by enlarging the sizes of the planar component bodies in consideration of the horizontal and vertical lengths of the canvas.

In an embodiment, when the hologram target object includes three planar component bodies, the hologram object generation unit 310 may further perform the steps of determining the sizes and positions of left and right planar component bodies disposed in left and right canvases, respectively, to correspond to a planar component body disposed in the central canvas, and moving a horizontal central axis of the left and right planar component bodies downward by a predetermined distance. The left and right planar component bodies disposed on the left and right canvases may be formed to correspond to the positions and sizes of the planar component body disposed on the central canvas, and when disposed to correspond to the central planar component body, the left and right planar component bodies may be disposed out of the canvas boundary.

That is, the hologram object generation unit 310 may move the horizontal central axis of the left and right planar component bodies downward by a predetermined distance, thereby preventing a phenomenon in which a part of the hologram is not formed on the reflective surfaces disposed on the left and right. The hologram generation device 130 may preset and use a movement distance with respect to the horizontal central axis of the left and right planar component bodies according to an enlargement ratio of the planar component body.

The hologram generation unit 330 may generate a three-dimensional hologram of the 3D object by outputting the hologram target object toward the reflective surfaces formed to correspond to at least three directions through the flat display panel, respectively. The flat display panel may have a pyramid shape when disposed above the reflective surfaces, and have an inverted pyramid shape when disposed below the reflective surfaces, and an image reproduced through the flat display panel may be automatically output toward the reflective surfaces. The output image may be reflected on or pass through the reflective surfaces, and may form a hologram in a mirror polyhedron module formed of at least three reflective surfaces.

In an embodiment, the hologram generation unit 330 may include a mirror polyhedron module including at least three reflective surfaces and a flat display panel module that outputs a hologram target object toward at least three reflective surfaces through flat display panels disposed above and below the mirror polyhedron module. The hologram generation unit 330 may include a flat display panel module as a reproduction module that reproduces an image for a hologram to generate a three-dimensional hologram, and may include a mirror polyhedron module as a module including reflective surfaces that reflect or pass through an image outputted through the flat display panel module to generate a hologram.

The mirror polyhedron module may include at least three reflective surfaces, and the respective reflective surfaces are formed to be inclined at a predetermined angle and connected to each other to form a polygonal pyramid. The mirror polyhedron modules may be disposed above and below the flat display panel, and may be formed to be integrated with the flat display panel module. The flat display panel module may output the hologram target object toward at least three reflective surfaces through the flat display panel.

In an embodiment, the flat display panel module may include a mobile device housing capable of detachably coupling a mobile display device including the flat display panel. The flat display panel module may be implemented in a form integrated with the mirror polyhedron module. In this case, the flat display panel module may be implemented by including a mobile device housing coupled with the mirror polyhedron module and separately coupled to the mobile display device.

That is, when the mobile display device is coupled to the mobile device housing, the hologram generation unit 330 may reproduce the hologram target object through the flat display panel included in the mobile display device. The reproduced image is reflected by the mirror polyhedron module implemented in combination with the mobile device housing, and a three-dimensional hologram may be generated by the reflected image.

The interaction providing unit 350 may provide two-way interaction with the three-dimensional hologram in connection with the user terminal 170. The user may perform the interaction with the hologram generated by the hologram generation device 130 through the user terminal 170. For example, the user may adjust any one of the size, position, and direction of the hologram reproduced on the terminal screen through the user terminal 170, and accordingly, the hologram generated by the hologram generation device 130 may be changed in real time. The interaction providing unit 350 may provide an interface to the user terminal 170 for interaction with the user, and the corresponding interface may be provided in the form of a separate application installed and operated in the user terminal 170.

In an embodiment, the interaction providing unit 350 may provide synchronization between the mobile display device and the user terminal 170, and may change at least one of the size, rotation direction, color, sound, text, and rotation of the three-dimensional hologram in real time according to a control signal received from the user terminal 170 in the synchronization process. In this case, the control signal received from the user terminal 170 may correspond to a touch or gesture signal of the user according to a type of terminal.

For example, the user may freely adjust the size, direction, color, etc. of the hologram generated by the hologram generation device 130 by inputting a touch operation through the user terminal 170. However, when it is difficult to apply the control signal of the user to a currently generated hologram, the hologram generation device 130 may notify the corresponding information through the user terminal 170.

In addition, the interaction providing unit 350 may perform authentication for the user terminal 170 before providing the synchronization between the mobile display device and the user terminal 170. Through this, the hologram generation device 130 may prevent indiscriminate changes in the hologram by imparting the interaction authority with the currently generated hologram to only the authenticated user.

Meanwhile, the interaction providing unit 350 may change in real time the sound, text, or rotation of the three-dimensional hologram according to the control signal received from the user terminal 170 in the synchronization process.

In an embodiment, the interaction providing unit 350 may limit a synchronization time with the user terminal 170. In order to provide interaction with the hologram to various users, the interaction providing unit 350 may set a synchronization time for interaction for each terminal to automatically release synchronization when the corresponding time elapses.

The control unit 370 may control the overall operation of the hologram generation device 130, and manage a control flow or data flow between the hologram object generation unit 310, the hologram generation unit 330, and the interaction providing unit 350.

FIG. 4 is a flowchart illustrating a hologram generating process enabling two-way interaction performed by the hologram generation device illustrated in FIG. 1.

Referring to FIG. 4, the hologram object generation unit 310 of the hologram generation device 130 may generate a hologram target object composed of planar component bodies in an exploded view in which a plurality of canvases and a 3D object which form a screen area of a flat display panel are exploded in each of at least three directions (step S410). The hologram generation unit 330 of the hologram generation device 130 may generate a three-dimensional hologram of the 3D object by outputting the hologram target object toward the reflective surfaces formed to correspond to at least three directions through the flat display panel, respectively (step S430).

In addition, the interaction providing unit 350 of the hologram generation device 130 may provide two-way interaction with the three-dimensional hologram in connection with the user terminal 170 (step S450). The interaction providing unit 350 of the hologram generation device 130 may provide changes in size, direction, and color of the hologram and addition/reproduction of sound, voice, and text according to the interaction (step S470).

FIG. 5 is a diagram for describing an embodiment of the hologram generation unit illustrated in FIG. 3.

Referring to FIG. 5, the hologram generation unit 330 may include a mirror polyhedron module (FIG. 5A) including at least three reflective surfaces 510 and a flat display panel module (FIG. 5B) that projects a hologram target object toward at least three reflective surfaces 510 through flat display panels disposed above and below the mirror polyhedron module. In this case, the mirror polyhedron module and the flat display panel module may be combined to be implemented as one device, and the hologram generation unit 330 may generate a three-dimensional hologram through this.

In an embodiment, the flat display panel module may include a mobile device housing 530 capable of detachably coupling a mobile display device 550 including the flat display panel. The mobile device housing 530 may be coupled to the mirror polyhedron module, and may be implemented to include a structure capable of supporting the mobile display device on the mirror polyhedron module.

In FIG. 5, the mobile device housing is illustrated in a rectangular shape according to the shape of the mobile display device, and may be implemented, but is not necessarily limited thereto, in various shapes and structures as needed. The user may output a hologram target object by coupling the mobile display device 550 (e.g., a smartphone) owned by the user to the mobile device housing 530, and view a hologram of the 3D object formed inside the mirror polyhedron module.

FIG. 6 is a diagram for describing a process of disposing planar component bodies based on a center of a 3D object.

Referring to FIG. 6, the left drawing of FIG. 6A corresponds to a drawing illustrating the center and size of an object when viewing a 3D object from the front side, and the right drawing of FIG. 6A corresponds to a drawing illustrating the center and size of an object when viewing a 3D object from the top.

The hologram generation device 130 may arrange a central planar component body on the central canvas through the hologram object generation unit 310, and set a box area 610 including the 3D object as the entire object area and set the center of the box area 610 as the center of the object.

In FIG. 6B, the hologram object generation unit 310 matches the center of a central planar component body 635 with the center of a circle inscribed in the central canvas 615 with each other to dispose the central planar component body 635 on the central canvas 615. In addition, the hologram object generation unit 310 may dispose left and right planar component bodies 631 and 633 in the left and right canvases 611 and 613 to correspond to the central planar component body 635, respectively.

FIG. 7 is a diagram for describing a process of optimizing the sizes of planar component bodies.

Referring to FIG. 7, the hologram generation device 130 may optimize the sizes of planar component bodies disposed on each canvas through the hologram object generation unit 310. In FIG. 7A, when the horizontal length of the 3D object is greater than the vertical length at a predetermined ratio or more, the hologram object generation unit 310 may move the center of the planar component body downward by a predetermined distance, and enlarge the size of the central planar component body in a direction of the left and right boundaries of the central canvas with respect to the center of the central planar component body.

In general, when the center of the circle inscribed in the central canvas is matched with the center of the object, if the horizontal length is greater than the vertical length as illustrated in the left of FIG. 7A, the size of the generated hologram becomes too small or the left and right ends may be cut off. Accordingly, when a difference between the horizontal and vertical lengths is large, an enlarged hologram may be generated by moving the center of the object downward. The reason is that the shape of the canvas, which is an area to be projected as a hologram, is a trapezoidal (including a triangle) shape that is larger at the bottom and smaller toward the top. Accordingly, when the central axis is moved downward, the width of the sides may be greater.

In FIG. 7B, when the vertical length of the 3D object is greater than the horizontal length, the hologram object generation unit 310 may move the center of the planar component body upward by a predetermined distance, and enlarge the size of the central planar component body in a direction of the upper and lower boundaries of the central canvas with respect to the center of the central planar component body. In this case, the hologram object generation unit 310 may simultaneously adjust the positions and sizes of the left and right planar component bodies to correspond to the central planar component body.

In general, if the center of the circle inscribed on the central canvas is matched with the center of the object, even if the planar component bodies in the canvas are rotated at 360° in any direction as illustrated in the left of FIG. 7B, there is an advantage that the planar component bodies are all indicated in the hologram, but it can be seen that there is still an upper free space. If the centers of the planar component bodies move upward and are enlarged as illustrated in the right of FIG. 7B, a larger hologram image may be obtained. In this case, there is an advantage of obtaining a large hologram image when the hologram object only rotates sidewards around the center, or when the moment when a part of the object is cut off and not displayed may be ignored even if the hologram object rotates at 360°.

FIG. 8 is a diagram for describing a process of maximizing a hologram image by aligning the horizontal central axes of left and right planar component bodies when a canvas is composed of three sides.

Referring to FIG. 8, the hologram generation device 130 may adjust the positions of left and right planar component bodies disposed on left and right canvases through the hologram object generation unit 310 to obtain a larger hologram image.

In FIG. 8A, when the hologram object generation unit 310 may set a place where the centers of left and right planar component bodies 810 and 830 meet each other upward by 45° from the left and right corners of the central canvas as a horizontal axis, respectively, to set the center of the left and right canvases and set the centers the planar component bodies in the left and right canvases, since the planar component bodies in the left and right canvases have many parts out of an actual display area, there may be a problem that left and right areas of the actual hologram are not displayed.

In FIG. 8B, it can be seen that the left and right canvases of the canvas exploded into three sides are not symmetrical, wherein one side is large and the other side is small. That is, in order to obtain a holographic image as large as possible, it is better to secure a larger canvas space. Accordingly, the hologram object generation unit 310 moves a horizontal central axis 850 of the left and right planar component bodies 810 and 830 downward by a predetermined distance, thereby minimizing a problem that the left and right areas of the actual hologram are not displayed.

The hologram generation device 130 may preset and use the movement distances of the left and right planar component bodies 810 and 830 in consideration of the size of the hologram target object. Therefore, when comparing FIGS. 8A and 8B, it can be seen that FIG. 8B has a larger hologram image than that of FIG. 8A. This is because a general display has a horizontally long rectangular shape. Accordingly, when a trapezoidal canvas is made from a rectangular panel and a planar component body optimized for the canvas is made, it is possible to minimize a part where the hologram image is cut since the planar component body is out of the area of the canvas or the area of the display panel.

FIG. 9 is a diagram for describing various embodiments of the hologram generation device illustrated in FIG. 1 and screen configurations of holograms to be generated.

Referring to FIG. 9, the hologram generation device 130 may be implemented in various forms to generate a hologram. The hologram generation device 130 may generate a hologram target object 930 based on planar component bodies and output the hologram target object 930 through a flat display panel 910. The hologram target object 930 may be reflected through a reflective surface 950 to form a hologram 970.

The hologram generation device 130 may generate a hologram target object that is output toward three reflective surfaces, and may also generate, but is not necessarily limited thereto, a hologram target object output toward the corresponding reflective surfaces when it consists of four reflective surfaces as illustrated in FIG. 9.

The hologram generation device 130 may generate the hologram target object 930 in various shapes, and when a screen to be implemented has a square pyramid shape as illustrated in FIG. 9A, all the screen areas may be formed only in a triangular shape. In addition, when the screen to be implemented is a trapezoidal pyramid shape as illustrated in FIG. 9B, all screen areas may be formed only in a trapezoidal shape, and when the entire rectangular display is to be used as a screen as illustrated in FIG. 9C, a part of a triangular screen area and a part of a trapezoidal screen area may be formed in combination.

The hologram generation device 130 may generate a hologram target object 930 suitable for the shape of a device to be implemented. Meanwhile, the hologram generation device 130 may be implemented by including a flat display panel 910 and a reflective surface 950. The flat display panel 910 may be implemented by including in the hologram generation device 130, and may output the hologram target object 930 generated by the hologram generation device 130 to reflect a hologram image of a 3D object through the reflective surface 950. At this time, a part of the hologram image may be reflected by the reflective surface 950 and the rest thereof may pass through the reflective surface 950, and a hologram 970 may be formed in the inner space of the reflective surface 950 by the reflected image.

The present invention has been described with reference to the preferred embodiments of the present invention, but it may be understood by those skilled in the art that various modifications and variations are possible within the technical idea of the present invention and the scope equivalent to the claims set forth below.

EXPLANATION OF REFERERNCE NUMERALS AND SYMBOLS

100: Hologram generation system
110: External system 130: Hologram generation device
150: Database 170: User terminal
210: Processor 230: Memory
250: User input/output unit 270: Network input/output unit
310: Hologram object generation unit 330: Hologram generation unit
350: Interaction providing unit 370: Control unit
510: Reflective surface 530: Mobile device housing
550: Mobile display device
610: Box area 611: Left canvas
613: Right canvas 615: Central canvas
631: Left planar component body 633: Right planar component body
635: Central planar component body
810: Left planar component body 830: Right planar component body
850: Horizontal central axis
910: Flat display panel 930: Hologram target object
950: Reflective surface 970: Hologram

The invention claimed is:

1. A hologram generation device enabling two-way interaction comprising:
a hologram object generation unit for generating a hologram target object composed of planar component bodies in an exploded view in which a plurality of canvases and a 3D object which form a screen area of a flat display panel are exploded in each of at least three directions;
a hologram generation unit for generating a three-dimensional hologram of the 3D object by outputting the hologram target object through the flat display panel toward reflective surfaces, respectively, corresponding to the at least three directions; and
an interaction providing unit for providing two-way interaction with the three-dimensional hologram in connection with a user terminal,
wherein the hologram object generation unit performs the steps of generating at least one central canvas and left and right canvases symmetrically formed on both sides of the central canvas in an exploded view;
arranging a first center of each planar component body and a second center of a circle inscribed in each canvas to match each other in a process of arranging planar component bodies on each of the central canvas and the left and right canvases, respectively;
moving the first center downward by a predetermined distance when the horizontal length of the 3D object is greater than the vertical length thereof, or moving the first center upward by a predetermined distance when the vertical length of the 3D object is greater than the horizontal length thereof, with respect to the planar component bodies disposed in the central canvas; and
enlarging the sizes of the planar component bodies in a boundary direction of the central canvas based on the first center.

2. The hologram generation device enabling two-way interaction of claim 1, wherein the hologram object generation unit receives 3D data of a 3D object determined by a user's selection via a network, and generates the hologram target object based on the 3D data.

3. The hologram generation device enabling two-way interaction of claim 1, wherein when the hologram target object includes three planar component bodies, the hologram object generation unit further performs the steps of determining the sizes and positions of left and right planar component bodies disposed in left and right canvases, respectively, to correspond to a planar component body disposed in the central canvas, and moving a horizontal central axis of the left and right planar component bodies downward by a predetermined distance.

4. The hologram generation device enabling two-way interaction of claim 1, wherein the hologram generation unit includes a mirror polyhedron module including at least three reflective surfaces; and a flat display panel module that outputs a hologram target object toward at least three reflective surfaces through flat display panels disposed above and below the mirror polyhedron module.

5. The hologram generation device enabling two-way interaction of claim 4, wherein the flat display panel module includes a mobile device housing capable of detachably coupling a mobile display device including the flat display panel.

6. The hologram generation device enabling two-way interaction of claim 5, wherein the interaction providing unit provides synchronization between the mobile display device and the user terminal, and changes at least one of the size, rotation direction, color, sound, text, and rotation of the three-dimensional hologram in real time according to a control signal received from the user terminal in the synchronization process.

* * * * *